US008147696B1

(12) United States Patent
Pandya

(10) Patent No.: US 8,147,696 B1
(45) Date of Patent: Apr. 3, 2012

(54) HIGH-EFFICIENCY WATER-SOFTENING PROCESS

(76) Inventor: Ken V. Pandya, Plano, TX (US)

( * ) Notice: Subject to any disclaimer, the term of this patent is extended or adjusted under 35 U.S.C. 154(b) by 396 days.

(21) Appl. No.: 11/523,679

(22) Filed: Sep. 19, 2006

(51) Int. Cl.
 *C02F 1/56* (2006.01)
 *C02F 5/02* (2006.01)
(52) U.S. Cl. ........ 210/638; 210/639; 210/709; 210/717; 210/725; 210/727; 210/912
(58) Field of Classification Search .................... 210/705
 See application file for complete search history.

(56) References Cited

U.S. PATENT DOCUMENTS

| | | | | | |
|---|---|---|---|---|---|
| 3,171,804 | A | * | 3/1965 | Rice | 210/724 |
| 3,262,877 | A | * | 7/1966 | Compte, Jr. | 210/712 |
| 3,976,569 | A | * | 8/1976 | Sheppard et al. | 210/724 |
| 4,036,749 | A | * | 7/1977 | Anderson | 210/638 |
| 4,108,768 | A | * | 8/1978 | Sebelik et al. | 210/705 |
| 4,392,944 | A | * | 7/1983 | Kessick | 208/188 |
| 4,981,599 | A | * | 1/1991 | Stewart, Jr. | 210/725 |
| 5,059,317 | A | * | 10/1991 | Marius et al. | 210/202 |
| 5,266,210 | A | * | 11/1993 | McLaughlin | 210/710 |
| 5,879,563 | A | * | 3/1999 | Garbutt | 210/726 |
| 6,296,773 | B1 | * | 10/2001 | McMullen et al. | 210/713 |
| 6,582,605 | B2 | * | 6/2003 | Krulik et al. | 210/638 |
| 7,022,240 | B2 | * | 4/2006 | Hart et al. | 210/712 |
| 7,048,852 | B2 | * | 5/2006 | Ballard | 210/195.3 |
| 7,520,993 | B1 | * | 4/2009 | Laraway et al. | 210/652 |
| 7,815,804 | B2 | * | 10/2010 | Nagghappan | 210/638 |
| 7,824,552 | B2 | * | 11/2010 | Slabaugh et al. | 210/709 |

* cited by examiner

*Primary Examiner* — Peter A Hruskoci
(74) *Attorney, Agent, or Firm* — Jack D. Stone, Jr.; Scheef & Stone, L.L.P.

(57) ABSTRACT

A method for purifying a water process stream whereby a precipitating agent is added to the water process stream to elevate the process stream pH to at least 10.5 to drop out precipitates which form separated solids comprising at least one of calcium precipitate, magnesium precipitate, barium precipitate, strontium precipitate, and silica precipitate. The separated solids are then coagulated and removed from the water process stream so as to yield a purified water process stream.

12 Claims, 6 Drawing Sheets

HIGH-EFFICIENCY WATER-SOFTENING PROCESS

FIELD OF THE INVENTION

This invention relates generally to water treatment/purification processes and, specifically, to softening processes which are effective in treating highly contaminated surface waters, well waters, waste waters, and process effluent waste streams.

BACKGROUND OF THE INVENTION

A Critically Important Need: An Efficient Water-Softening Process

To understand what is commonly referred to as a water "softening" process, one need only understand the etymology of the classic definition of water "hardness." Traditionally, "hard" water was water that featured high levels of certain common impurities such as calcium (Ca) and magnesium (Mg). Water purification processes which facilitated the removal of these offensive "hard" cations were therefore quickly referred to as "softening" processes, a term that has prevailed even as purification processes have advanced and expanded in scope.

Various approaches have been adopted in the search for an industrially robust, high-efficiency water softening process that could address a broad range of impure waters. Many of these approaches feature important shortcomings.

Conventional Water-Softening Processes.

For example, most of the conventional water-softening processes are designed for relatively low levels of hardness (and, specifically, hardness of a sort consisting mostly of Ca and Mg). The novel softening process disclosed herein is designed for a broad range of contaminants. Specifically, it is particularly well-suited for removing a broad (but, unfortunately, common) array of contamination agents (namely, Ca, Mg, Ba, Sr, iron, manganese, copper, zinc, aluminum, silica, TOC, oil, and grease).

Unlike many conventional softening processes that use lime and soda ash as the primary chemical agents to deliver bicarbonate and carbonate alkalinities, the novel softening process can utilize carbon dioxide or carbon monoxide in alkaline solution, thus creating bicarbonate or carbonate ions by chemical reaction.

Unlike conventional cold lime softening, hot lime softening or lime-soda ash softening, reverse osmosis membrane, or electro-dialysis reversal processes, all of which are conducted at a pH level of at or about 10.5, the novel softening process disclosed herein works at elevated pH levels, and not uncommonly at pH levels of between at or about 10.5 and at or about 14.0.

Unlike conventional cold lime softening, hot lime softening, or lime-soda ash softening processes that rely on the use of lime and soda ash as the primary softening agents, the novel softening process disclosed herein can work with soda-ash, potassium hydroxide, or sodium hydroxide as the chemical agents.

Unlike hot-lime softening processes, which must be conducted at elevated temperatures in order to be effective, the novel softening process disclosed herein can be carried out at ambient temperatures, although the rate of reaction will be faster at elevated temperatures.

In the conventional lime softening process, hot lime softening process, or lime-soda ash process, it is sometimes difficult to ensure that the lime (CaO) or hydrated lime ($CaOH_2$) goes effectively into solution. The novel softening process disclosed herein does not feature this particular problem, as soda ash can readily go into solution and sodium hydroxide is soluble in all concentrations.

In conventional lime softening processes, hot lime softening processes, lime-soda ash processes, processes that use softening membranes, and/or processes that use electro-dialysis membranes, the treated water will nearly always contain some level of calcium impurities, as well as magnesium, Ba, Sr, and other metals. The novel softening process disclosed herein works extremely efficiently in terms of removing these impurities to negligible levels.

Some prior art approaches, such as the approach described in U.S. Pat. No. 5,152,904, utilize a process frequently referred to as a seeded slurry process; however, the novel softening process disclosed herein does not feature or require such an approach. Similarly, some seeded slurry processes are critically dependent upon the size of the crystal; once again, the novel softening process disclosed herein features no such crystal size dependency.

Energy-Driven Processes.

Unlike energy-driven processes such as reverse osmosis, electro-dialysis, or electro-deionization, the novel softening process disclosed herein utilizes very little energy; in fact, in most cases, the energy consumption comes from mixing devices and transfer pumps. Furthermore, the novel softening process can be carried out under atmospheric pressure or at elevated pressures.

Unlike most competitive processes, such as reverse osmosis, the novel softening process disclosed herein does not require expensive materials of construction such as high-quality alloys. In most cases, inexpensive materials, such as polyvinyl chloride (hereinafter "PVC"), fiberglass, carbon steel, or stainless steel, can be used. In some applications that contain extremely high levels of chlorides, it may be advantageous to use super-stainless steel or duplex stainless steel materials.

In the conventional processes that utilize reverse osmosis membrane technologies, electro-dialysis membrane technologies, or electro-deionization membranes, it is extremely critical to remove sparingly soluble species (such as calcium, magnesium, silica, barium and strontium) in the pretreatment process; otherwise, the calcium, magnesium, silica, barium or strontium deposits could form a devastating scale on the process components. The novel softening process disclosed herein has no limits with respect to the levels of these scaling agents.

Unlike the membrane based softening processes that generally get fouled in the presence of excess amounts of certain coagulation aid chemicals (such as alum or ferric salts or polymers), the novel softening process disclosed herein can be carried out in presence of excess amounts of coagulation aid chemicals.

Some prior art efforts in this area, such as, for example, U.S. Pat. No. 3,976,569, utilize cross flow filtration membranes; however, the instant novel softening process does not require the use of such membranes.

In addition, unlike the Green and Behrman process disclosed in U.S. Pat. No. 1,653,272, which is mostly intended for hardness based upon Ca and Mg impurities, and which mostly uses a lime and soda-type process (again, used for mostly low-hardness surface waters), the novel softening process is intended for a broad range of contaminations. It uses a high-pH mode of operation by using chemicals such as soda ash and/or sodium hydroxide, potassium carbonate, or potassium hydroxide and is intended to treat surface waters, seawater, produced waters from oil and gas drilling operations and wastewaters from municipal as well as industrial applications.

Ion Exchange Processes.

The novel softening process disclosed herein is not an ion exchange process.

Ion exchange processes are mostly batch processes; they generally achieve softening by exchanging ions on an ion exchange resin. Once the ion exchange resin is fully exhausted (i.e., it has no further capability for exchanging hardness for, e.g., the sodium ion or the hydrogen ion), it has to be regenerated, typically, by either salt or acid.

Conventional ion exchange processes are very inefficient in terms of chemicals usage for the removal of specific impurities. Also, note that ion exchange systems simply do not work for highly contaminated streams, because the throughput capacities become very small (i.e., the ion exchange systems in such applications tend to require almost constant regeneration). Furthermore, spent regeneration chemicals have to be disposed of which presents a further managerial/technical problem.

The novel softening process disclosed herein is extremely efficient in terms of producing high-quality effluent while simultaneously generating a minimum volume disposal stream. In fact, a typical sludge/waste stream from the novel softening process can be reprocessed to recover the water stream, thus making the novel softening process an important part of any zero liquid discharge (hereinafter "ZLD") process.

Conventional ion exchange water softeners require use of a sodium chloride solution for regeneration. These processes are mostly effective in exchanging Ca and Mg species, but are not terribly effective at all with regard to Ba and Sr. Furthermore, any presence of iron, manganese, oil, grease, and/or organic matter tends to create serious fouling of the ion exchange resin. The novel softening process disclosed herein does not feature these kinds of process limitations.

Finally, the conventional ion exchange water softeners of the prior art commonly require removal of suspended solids; otherwise, once again, the ion exchange resin can get plugged up and/or foul. The novel softening process disclosed herein does not feature these limitations.

Zero Liquid Discharge Technologies.

Zero liquid discharge (hereinafter "ZLD") technologies utilize a combination of pretreatment processes such as those described in the sections hereinabove.

In the conventional ZLD systems that utilize either lime, lime/soda ash, or hot lime, the resultant process stream must be further treated with acid or scale inhibitors to lower scale-forming tendencies and/or to prevent further precipitation of silica, calcium, magnesium, barium and/or strontium salts. The novel softening process disclosed herein does not feature these kinds of requirements.

In a typical ZLD system, the effluent pH from the pretreatment is lowered so as to reduce the scaling potential due to the presence of calcium, magnesium, strontium and/or barium. The lower pH effluent is typically highly aggressive and requires the use of exotic (and expensive) metallurgy such as titanium alloys, Hastalloy C, and/or Alloy 20.

The novel softening process effluent may be accepted without requiring the lowering of pH; thus, the metallurgy of the equipment downstream of the novel softening process can be fabricated from lower-cost alloys such as carbon steel, grade three zero four stainless steel (hereinafter "304 SS"), three hundred sixteen stainless steel (hereinafter "316 SS"), or Duplex stainless steel or Super duplex stainless steel or SMO 254. In certain situations, it is possible to fabricate the equipment downstream of the novel softening process from non-metallic materials such as polyvinyl chloride (hereinafter "PVC"), chlorinated PVC (hereinafter "CPVC"), polypropylene (hereinafter "PPL"), Teflon (hereinafter "PTFE"), or fiberglass reinforced plastic (hereinafter "FRP").

If the process stream is known to contain high levels of sodium, chlorides, sulfates, or carbonates and bicarbonates, the treated effluent from the novel softening process can be further treated by concentration processes or ZLD processes such as reverse osmosis, electro-dialysis, evaporators, or crystallizers. Concentrated streams from these processes can be highly pure, sterile, and could be recycled for further industrial or non-industrial uses (such as, for example, dry salt or chemicals manufacturing processes).

It is in light of the shortcomings mentioned above that the instant patent application has been prepared.

BRIEF SUMMARY OF THE INVENTION

A water-purification or water "softening" process is disclosed. The process is particularly effective for the treatment of water process streams containing a broad array of contaminants, such as Ca, Mg, Ba, Sr, iron, manganese, copper, zinc, silica, TOC, oil, and grease.

In brief, the process comprises the steps of:
(a) adding carbonate ions and hydroxide ions to said water process stream until the process stream pH is raised to between at or about 10.5 and at or about 14.0;
(b) adding a coagulation aid chemical so as to facilitate the creation of separated (i.e., the coagulation of suspended) solids comprising a substantial portion of the contaminants;
(c) adding a polyelectrolyte so as to facilitate the creation of separated (i.e., coagulation of suspended) solids comprising a substantial portion of the contaminants; and
(d) phase-separating the separated solids (i.e., mechanically separating the coagulated suspended solids) so as to remove the contaminants and produce a highly purified water process stream.

Various alternatives and options in the practice of the process are disclosed and will be readily appreciated by those of ordinary skill in the art.

DETAILED DESCRIPTION OF THE INVENTION

Benefit of the Invention

Figure 1A:
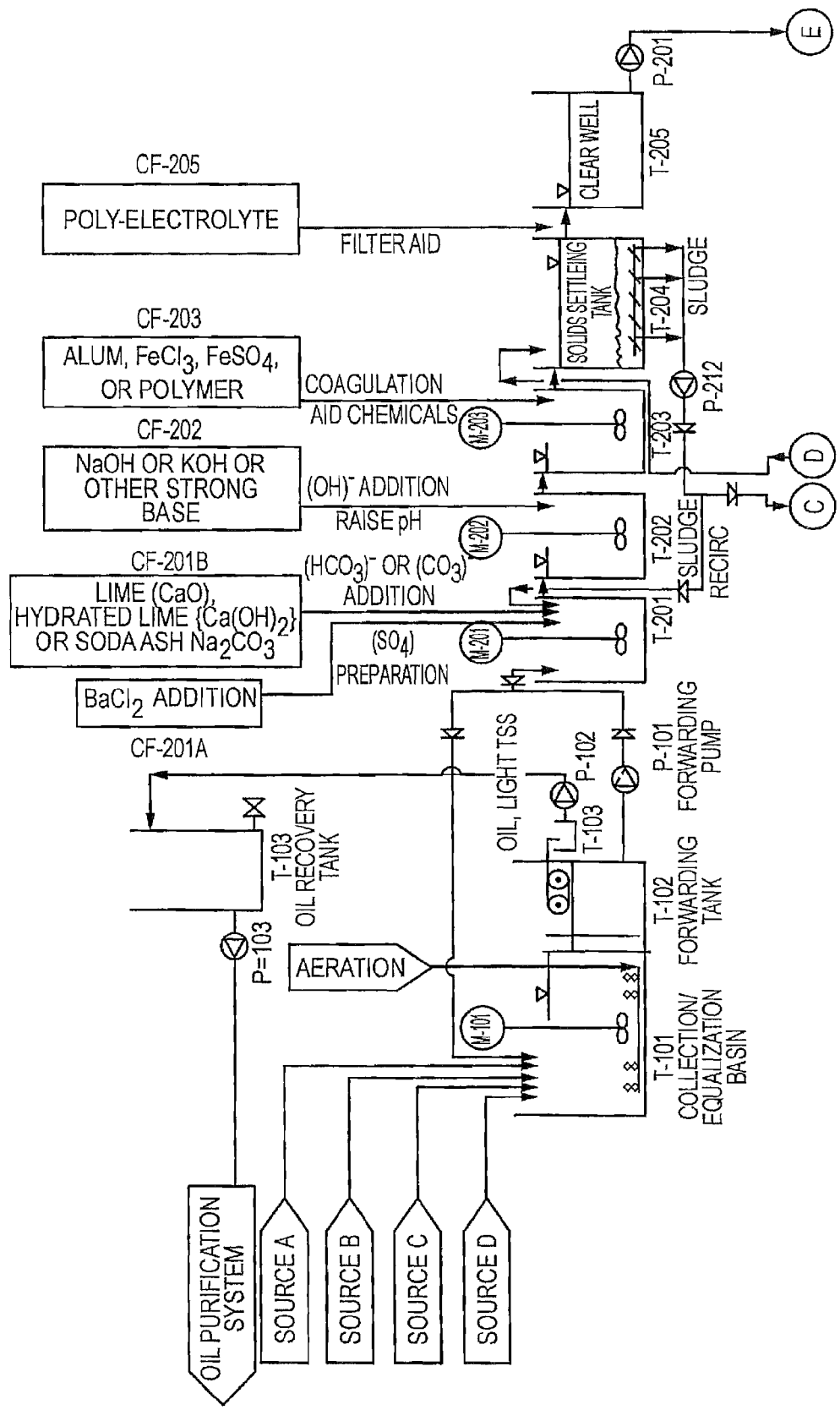
FIGS. 1A and 1B exemplify a piping/instrumentation drawing showing several aspects of one embodiment of the novel process disclosed herein.

The novel, high-efficiency softening process disclosed herein is a process that is extremely effective in treating highly contaminated surface waters, well waters, waste water and process effluent streams. Specifically, the process disclosed facilitates the effective removal and/or reduction of certain inorganic species such as calcium, magnesium, barium, strontium, iron, manganese, zinc, and silica, as well as certain species such as oil, grease, total organic carbon (hereinafter "TOC"), biochemical oxygen demand (hereinafter "BOD"), total suspended solids (hereinafter "TSS"), and colloidal material.

These species (or, contaminants) can be found in naturally occurring waters from almost all sources, including rivers, lakes, and the ocean. They can also be found in industrial, as well as municipal, wastewater streams, such as those waters produced from oil and gas drilling operations. In fact, these species can be found in very low levels (e.g., less than 100 ppm measured as $CaCO_3$) to very high levels (e.g., as high as 15,000 ppm measured as $CaCO_3$).

The presence of cations such as Ca, Mg, Sr and Ba, when combined with anions such as $CO_3$, $HCO_3$ and $SO_4$, can cause scaling and fouling to equipment such as cooling towers, boilers, hot water heaters and heat exchange equipment. In advanced water treatment processes, such as reverse osmosis, electro-deionization, or electro dialysis, the presence of these materials can cause fouling or scaling, thus increasing the cost of maintenance and/or operation. The presence of these species in certain process streams, such as, for example, sodium chloride (brine), can cause interference with the production of select chemicals such as caustic.

Disposal of waste streams that contain moderate to high levels of these species can also be a problem. In many parts of the world, industries and municipal agencies are required to eliminate the disposal of such streams. In certain parts of the world, the waste streams can be disposed off by means of deep-well injection; however, those streams must be pre-treated in order to remove certain objectionable species such as iron, manganese, suspended solids, and TOC.

For advanced treatment processes, such as evaporators and crystallizers, the presence of high levels of species such as Ca, Ba, Sr, iron, manganese, aluminum and silica can be a real problem. The scaling or fouling of these materials on heating surfaces can cause a substantial loss of heat transfer and even accelerate the rate of corrosion.

Based on the evidence to this date, the novel softening process disclosed herein works extraordinarily well under extremely difficult process conditions, including, for example, aqueous solutions that contain very high loads of Ca, Mg, Sr, Ba, TOC, Fe, Mn, Al, $SiO_2$, oil, and grease. In fact, in a recent study, the calcium and magnesium hardness level exceeded 10,500 mg/l, expressed as $CaCO_3$. Presence of such high levels of impurities can be found in highly concentrated waste streams, such as produced waters from oil and gas drilling operations, concentrated cooling tower blowdowns, reject streams from waste water RO applications, landfill leacheate, and superfund sites.

Understanding the Process: Relevant Chemical Reactions.

It is believed that the novel softening process is effective, in part, because it introduces either bicarbonate ($HCO_3$) or carbonate ($CO_3$) species to form precipitates under high-pH conditions, typically between pH range of 10.5-14.0.

Certain species such as silica, oil and grease can be co-precipitated or adsorbed on the carbonate, bicarbonate, or sulfate precipitates.

In most cases, the presence of coagulating aid chemicals (such as alum, ferric chloride, ferric sulfate, cationic or anion polymers, and polyelectrolyte chemicals) will enhance the coagulation process, making particles heavier, so as to facilitate quicker settling and enhance the speed of the reaction.

Carbonate and bicarbonate species can be derived from naturally occurring chemical compounds such as quick lime (CaO), hydrated lime, or soda ash.

In some cases, it may be more advantageous to consider reaction of carbon dioxide with alkali solution to create carbonate ions.

The novel softening process also allows for the addition of selected cations, such as Ca or Ba, to precipitate excess amounts of anions such as $SO_4$ and $CO_3$ under pH levels of 10.5-14.0.

In most cases, intimate mixing, contact time, and temperature of the process streams will play a critical role in enhancing the efficiency of the novel softening process.

Once the reaction is completed, the precipitated materials should be removed from the treated water stream by utilizing treatment processes such as settling, clarification, filtration, and/or advanced membrane separation.

Some of the chemical reactions which are believed to be important contributors to the overall mechanism of the novel softening process disclosed herein are:

(1) $CaCl_2 + Na_2CO_3 = CaCO_3 + 2\ NaCl$
(2) $CaCl_2 + K_2CO_3 = CaCO_3 + 2\ KCl$
(3) $BaCl_2 + Na_2SO_4 = BaSO_4 + 2\ NaCl$
(4) $SrCl_2 + Na_2SO_4 = SrSO_4 + 2\ NaCl$
(5) $CO_2 + 2NaOH = Na_2CO_3 + H_2O$
(6) $Fe^{(+3)} + (OH) = Fe(OH)_3$
(7) $Al^{(+3)} + (OH) = Al(OH)_3$

Understanding the Process: Step-by-Step.

Step 1: Collection of Process Streams.

Figure 2:
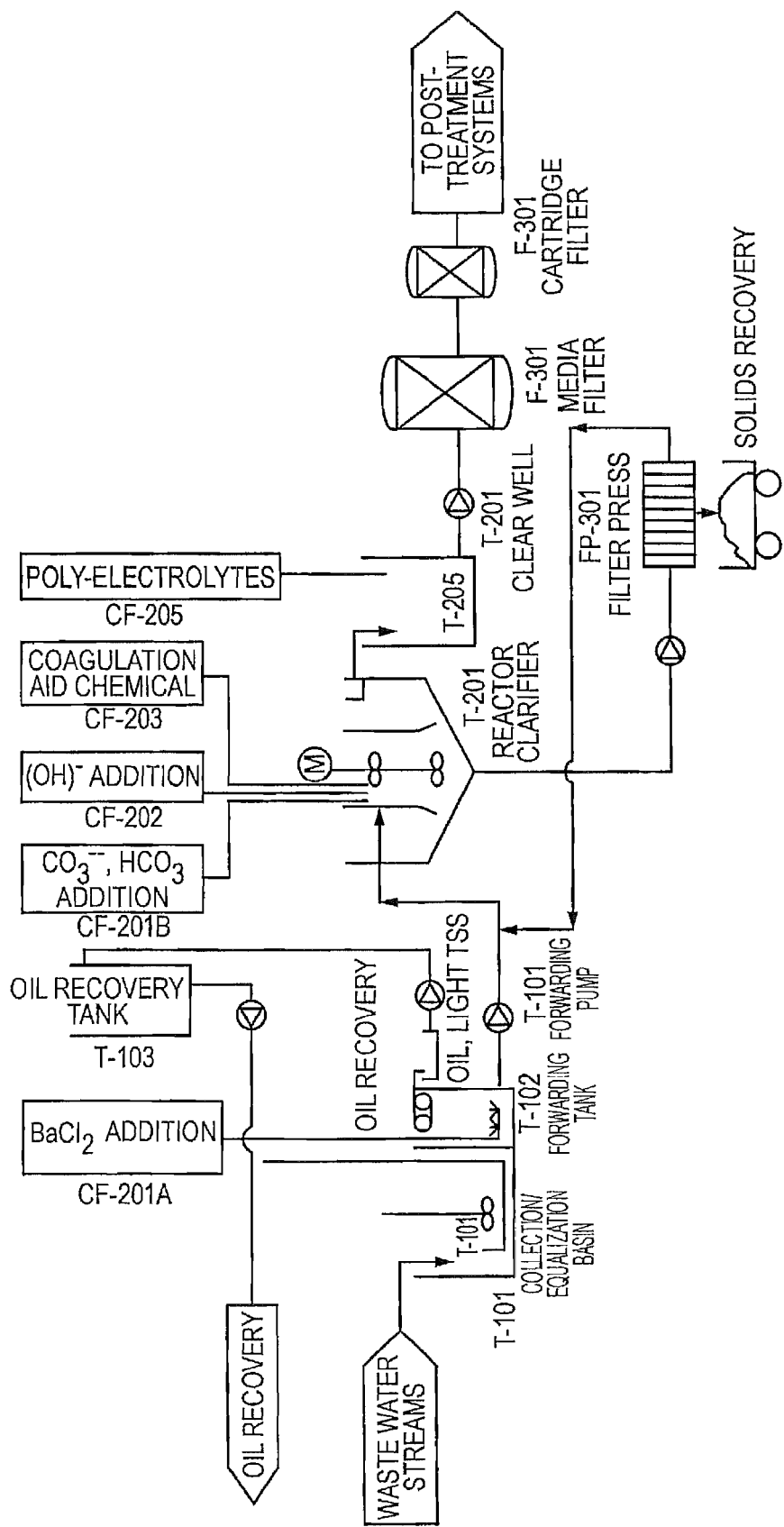
FIG. 2 exemplifies a piping/instrumentation drawing showing several aspects of an alternate embodiment of the novel process disclosed herein, the alternate embodiment comprising a reactor clarifier for performing the processes T-201, T-202, T-203, T-204 of the embodiment of FIGS. 1A and 1B.
Figure 5:
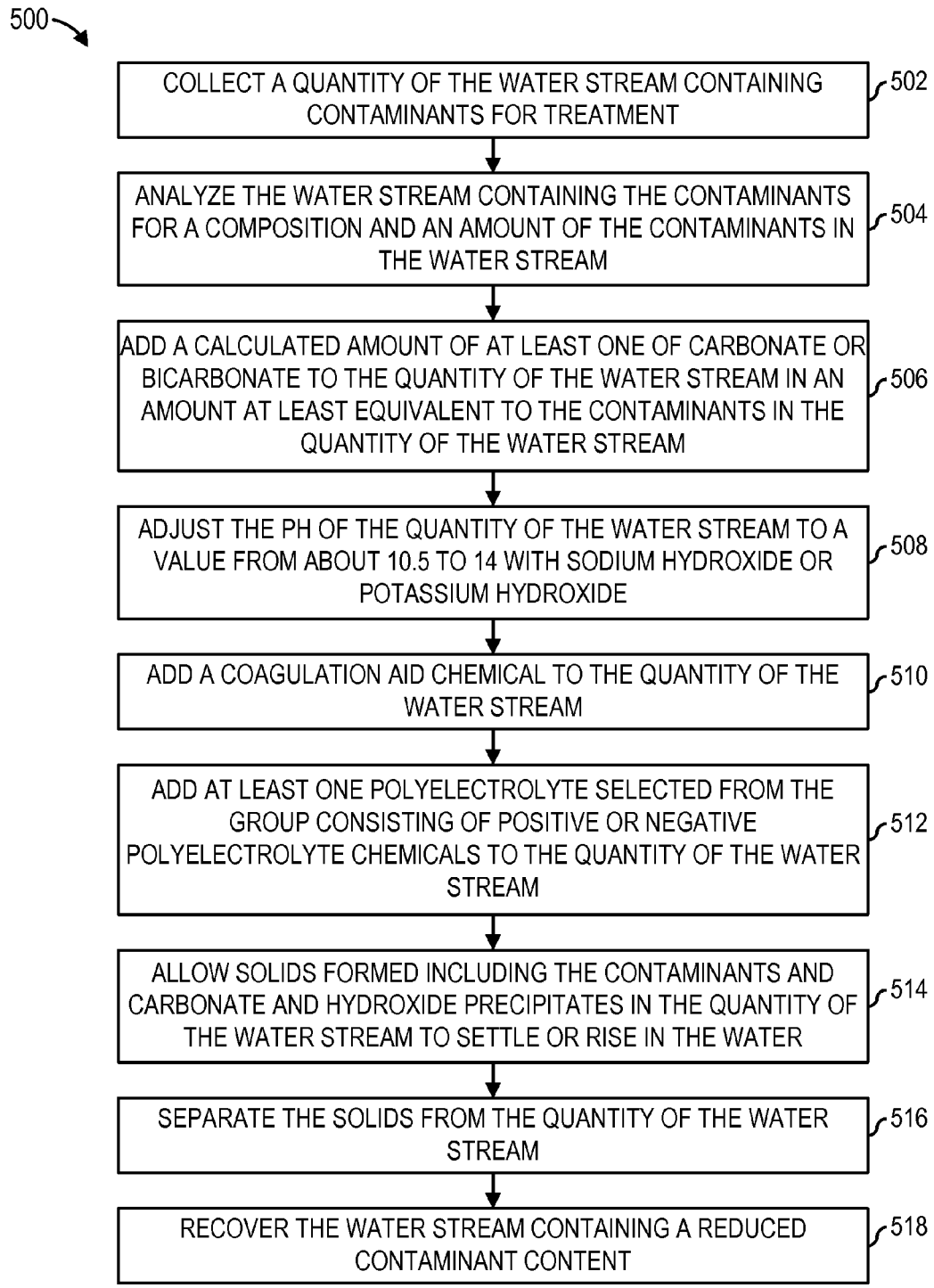
FIG. 5 exemplifies a flow chart illustrating steps for performing a water purification process embodying features of the novel process disclosed herein.

With reference to FIG. 1A, water process stream sources A, B, C, and D, a collection equalization basin tank T-101, an oil skimmer and collection tank T-103, and an oil recovery tank T-103, and with reference to the alternative embodiment of FIG. 2, Tank T-101, and with reference to FIG. 5, step 502, all of the contaminated process streams are collected in a storage tank or a pond. If the feed water composition is known to vary, better results are obtained if mixing, either via mechanical mixers, aeration blowers, or close recirculation of the liquid waste streams, is effected so as to create as homogeneous a solution as possible.

With reference to FIG. 5, step 504, it is helpful to analyze the composition of the process stream, including Ca, Mg, Na, Ba, Sr, K, $HCO_3$, $SO_4$, Cl, $SiO_2$, $NO_3$, Fe, Mn, oil and grease, TOC, pH, total dissolved solids (hereinafter "TDS"), conductivity, and TSS. The effect of variations on the process stream upon various process variations is discussed further herein.

Step 2: Addition of Alkalinity.

With reference to FIG. 1A, tank T-201, mixer M-201, chemical feed systems CF-201A and CF-201B for adding barium chloride, lime, hydrated lime, and/or soda ash, and with reference to the alternative embodiment of FIG. 2, $CO_3$ addition tank T-201 at reactor clarifier T-201, and with reference to FIG. 5, step 506, a calculated amount of carbonate or bicarbonate alkalinity is added in an amount at least equivalent to the incoming amount of Ca, Mg, Sr, Ba and other impurities.

In most cases, twenty percent (20%) excess alkalinity is added, so as to provide complete reaction and to speed the reaction process.

Calcium hydroxide slurries can be employed at this stage with the caveat that they do not always completely dissolve at lower pH levels; thus, while they can be used to effectuate an elevation of pH, they are more effective as the pH increases.

Carbonate ions may also be created by reaction of pure carbon dioxide or waste carbon dioxide. For example, exhaust from a natural gas burning machine may be combined with a strongly basic solution such as sodium hydroxide or potassium hydroxide. In most such cases, carbonate ions are then formed at a pH higher than 8.2.

The use of waste carbon dioxide is advantageous for several reasons of course. Putting any waste component to work is of course environmentally friendly and prudent; however, in light of recent concerns raised by some scientists that excess waste carbon dioxide potentially contributes to the greenhouse effect and/or global warming, the additional benefits of this approach towards implementation/execution of the invention become obvious.

Step 3: Elevation of pH.

With reference to FIG. 1A, tank T-202, mixer M-202, chemical feed system CF-202 for adding NaOH, or KOH or other strong base, and with reference to the alternative embodiment of FIG. 2, chemical feed system CF-202 for adding OH at reactor clarifier T-201, and with reference to FIG. 5, step 508, a basic solution such as sodium hydroxide or potassium hydroxide is added so as to raise the operating pH to between at or about 10.5 and at or about 14.0. Homogeneous solutions are created by mixing.

It is noteworthy that, frequently, step two and three are combined, because, if, for example, only soda ash is added, the pH is rarely expected to go much higher than at or about 10.5, because of the nature of the chemical itself. To superelevate the pH (i.e., to raise it higher than 10.5), the addition of an agent such as sodium hydroxide or potassium hydroxide is required.

This is a key reason why other processes feature an elevation of pH to at or about only 10.5. Partial softening occurs at a pH below 10.5, but complete softening of the type desired here occurs only at higher pH levels.

The desired pH range is 12-14 as it is in this range that complete softening/purification of the type desired occurs; however, it has also been observed that suboptimal, but nonetheless very good, results are observed in the pH range of 10.5-12.0.

Step 4: Coagulation.

With reference to FIG. 1A, tank T-203, mixer M-203, chemical feed system CF-203 for adding alum, ferric chloride, ferric sulfate, and/or polymer, and with reference to the alternative embodiment of FIG. 2, chemical feed system CF-203 for adding a coagulation aid chemical at reactor clarifier T-201, and with reference to FIG. 5, step 510, the required amount of coagulation aid chemical (such as ferric chloride, alum, or polymer) is added so as to create a floc. A homogeneous solution is created by mixing.

Note: alum, ferric chloride, ferric sulfate, polymers, and polyelectrolyte chemicals represent, as a class, the most commercially important coagulation aid chemicals in use today. In some commercial trials, even a low-cost waste caustic soda (25% NaOH), which was used in an aluminum extrusion process to etch out aluminum metal from extrusion dyes, has been used effectively as a coagulation aid agent. This provides a commercial benefit to aluminum fabricators (who would now not have to bear as heavy a burden in terms of (a) neutralizing the waste caustic, a common state law regulatory requirement, and (b) precipitating aluminum (via a filter press) and hauling same to a waste site.

In some cases, the process stream itself may contain flocculation aid chemicals. In other cases, the waste alkali solution may contain flocculation aid chemicals. In such cases, external dosing of coagulation aid chemicals may not be required or, at a minimum, could be minimized. An example of such a stream is a waste caustic stream, such as that referenced above, from an aluminum fabrication plant; often, such caustic streams contain a substantial level of aluminum.

Step 5: Addition of Polyelectrolyte.

With reference to FIG. 1A, chemical feed system CF-205 for adding polyelectrolyte, and with reference to the alternative embodiment of FIG. 2, polyelectrolyte addition at tank T-205, and with reference to FIG. 5, step 512, a measured amount of polyelectrolyte is added so as to aid the filtration and solids-settling process. Once again, a homogeneous solution is created by adding mixing energy.

For the benefit of those not skilled in the art, the term "polyelectrolyte" is a generic term known in the water treatment industry (analogous to the term "PVC" to the non-metallic fabricator). Polyelectrolyte chemicals are generally high-molecular weight, long-chain organic chemicals with either positive or negative charge (the type being selected based on the nature of the charge found on precipitate).

Sometimes, contrasting approaches are used with respect to the coagulation aid polymers and the polyelectrolyte chemicals in the water treatment process. For example, one might employ alum and a cationic polymer to make solids heavier and settle down. Then, one might end up with a small level of excess polymer that will tend to float away or bypass the system. However, by adding a polyelectrolyte of opposite charge, one can capture the small floating materials, still representing suspended solids, and make a secondary precipitation to achieve greater clarification.

Publicly available resources describe the polyelectrolyte chemical structure as follows:

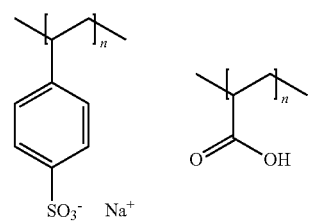

The above representations represent chemical structures of two synthetic polyelectrolytes as examples. The left hand structure is poly(sodium styrene sulfonate) (PSS); the right hand structure is poly(acrylic acid) (PAA). Both are negatively charged polyelectrolytes when dissociated. PSS is a 'strong' polyelectrolyte (fully charged in solution), whereas PAA is 'weak' (partially charged).

Polyelectrolytes are polymers whose repeating units bear an electrolyte group. These groups will dissociate in aqueous solutions (water), making the polymers charged. Polyelectrolyte properties are thus similar to both electrolytes (salts) and polymers (high molecular weight compounds), and are sometimes called polysalts. Like salts, their solutions are electrically conductive. Like polymers, their solutions are often viscous. Many biological molecules are polyelectrolytes. For instance, polypeptides (thus all proteins) and DNA are polyelectrolytes. Both natural and synthetic polyelectrolytes are used in a variety of industries.

Step 6: Solids Settling.

Figure 3:
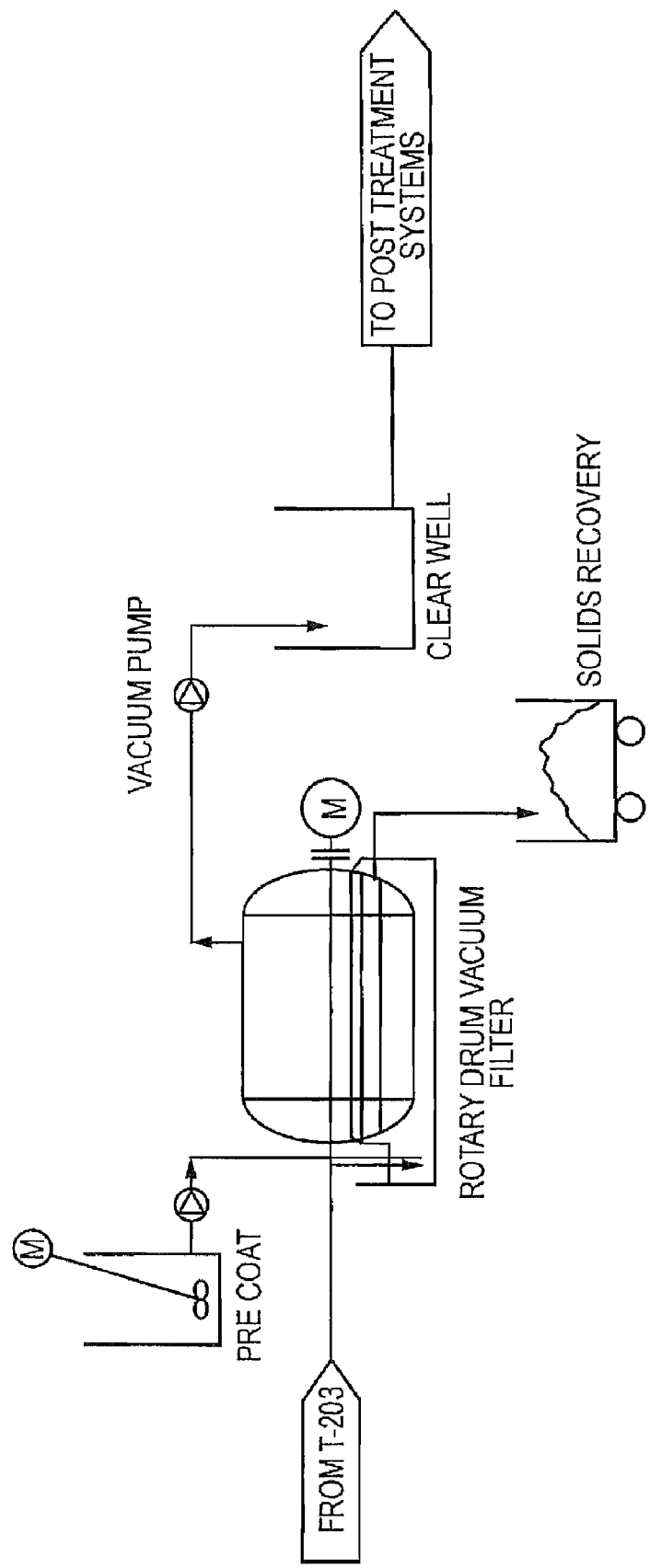
FIG. 3 exemplifies a piping/instrumentation drawing showing several aspects of a rotary drum vacuum filter of the novel process disclosed herein, the rotary drum vacuum filter being adaptable for replacing or supplementing the process T-204 of FIGS. 1A and 1B.
Figure 4:
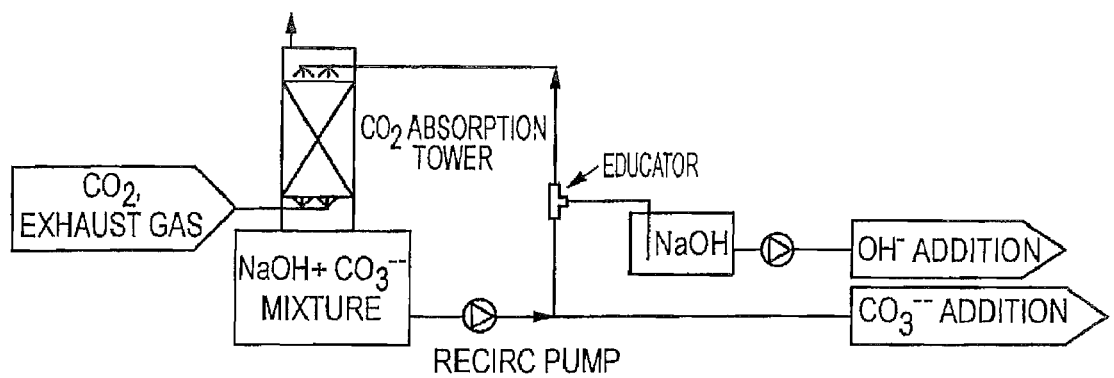
FIG. 4 exemplifies a piping/instrumentation drawing showing several aspects of a carbon dioxide unit embodying features of the novel process disclosed herein.

With reference to step 514 of FIG. 5, settling of solids is exemplified by FIG. 1A, which depicts removal of most of settled solids, and in tank T-204 where sludge is removed, though some small level of lighter solids can escape, the treatment of which is discussed in further detail below. In the alternative embodiment of FIG. 2, settled solids are depicted going from tank T-201 to FP-301. Removal of suspended solids is exemplified by FIG. 1B, which depicts mechanical separation by media filter and cartridge filter. In an alternative embodiment, FIG. 2 depicts the removal of settled solids by filter press and, in FIG. 3, the removal of suspended solids by rotary drum vacuum filter. FIG. 1A, T-103, exemplifies removal of oil and lighter floc.

In step six, the solids are allowed to settle down in a process that is commonly known as settling or clarification. Heavier solids, mostly carbonate or bicarbonate precipitates and metal hydroxide precipitates, settle down, and some of the lighter suspended solids, such as oil and grease, light organic matter, silica and colloidal material, get adsorbed onto the carbonate and hydroxide precipitates, and settle down with other solids.

In some processes, a lighter floc is created which will tend to rise above the process solution. In those cases, solids can be removed from the top by using equipment such as oil skimmers or dissolved air flotation.

Reaction time for steps two through six may vary depending on the nature of process fluid. In most cases, utilizing typical commercial mechanisms, a thirty-minute contact time is sufficient although, in select applications, the reaction may continue for several hours or days.

For example, in a wastewater that contained 10,500 ppm calcium and magnesium hardness, very high efficiency softening, at or about the 99.99% level, has been observed with less than 0.1 ppm hardness levels by using longer contact times; nearly 99% level softening, with less than 100 ppm hardness level, has been observed by using 30 minute contact times.

In some cases, it may be preferable to keep the precipitated solids in suspension. In those cases, precipitated solids, along with other suspended solids and colloidal solids, can be removed from the bulk stream by using a mechanical, solid-liquid separator, such as a filter (e.g., a rotary drum vacuum filter, filter press, media filter, membrane filter, ultra-filter system, or micro-filter system).

Step 7: Solids Separation.

With reference to FIG. 1A, tank T-204, and with reference to the alternative embodiment of FIG. 2, reactor clarifier T-201, and with reference to FIG. 5, step 516, settled solids are separated from the supernatant process solution. Solids can be removed from the bottom of a reactor vessel by means of a reaction clarifier or sludge thickener. In some cases, a scraper mechanism may be added to facilitate the removal of suspended solids. The clarified stream is collected in a storage vessel or other container for further processing.

As an option, a portion of the sludge can be re-circulated to further aid settling of the precipitated and suspended solids.

Step 8: Solids Separation.

Figure 1B:
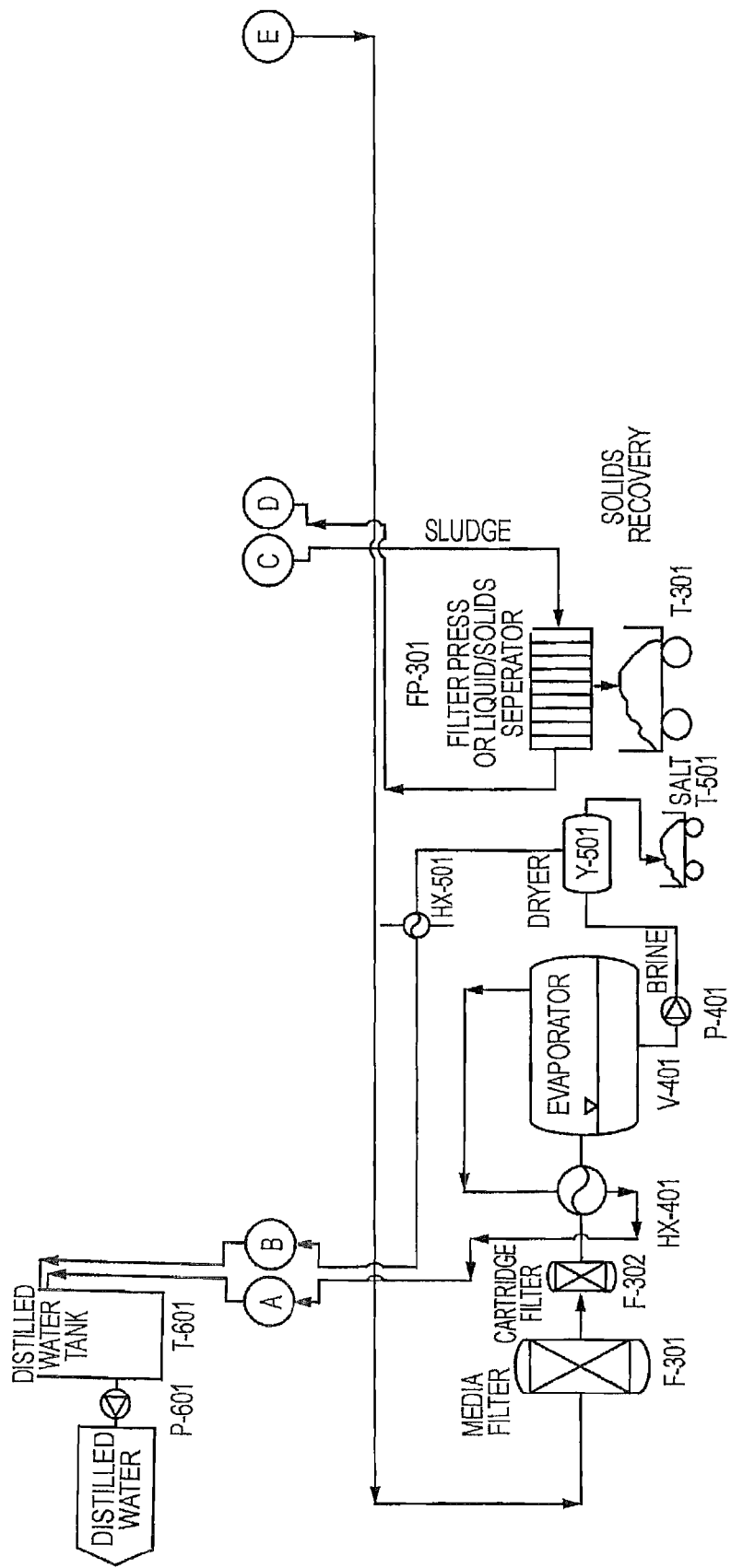

With reference to FIG. 1B, filter press FP 301, and with reference to the alternative embodiment of FIG. 2, filter press FP-301, and with reference to FIG. 5, step 518, solids are separated from the thickened sludge by using a mechanical device such as filter press, vacuum press, rotary drum vacuum filter, membrane filter, ultrafilter, or microfilter. Clear liquid is recycled for further use, and solids are recovered as a filter cake.

The filter cake can be dried to recover the precipitated solids. The solids can be recycled for further use.

Variations on the Foundational Process.

A person of ordinary skill in the art to which this invention pertains will immediately recognize a number of alternative design components/variations which would be appropriate to utilize in the face of various process stream exigencies; some of these are described hereinbelow.

In some cases, the number of process/reaction steps, as described above, may be reduced by combining several steps. For example, steps two, three, four and five may, in some instances, be carried out in a single reactor.

In some cases, the desired chemical reaction associated with a particular step will be sufficiently fast so that in-line addition of chemicals (rather than addition of chemicals directly to a reactor) is possible.

In some cases, the chemical reaction will be sufficiently fast, and reaction time sufficiently short, that minimizing the size of the reactor unit may be possible.

In some designs, it may well be possible to eliminate mechanical mixers and still achieve satisfactory results.

In some designs, it may be advantageous to consider the use of skimmers to collect lighter particles, such as oil and grease.

In some designs, it may be advantageous to first remove lighter particles, such as oil and grease, via dissolved air flotation and/or particle settlers, and then follow this process stream pre-treatment with the novel softening process described herein.

In some designs, it may be advantageous to use enhanced particle settling devices such as inclined plate clarifiers or tube settlers. The effluent from these processes can be further treated by using mechanical filters such as sand filters, multi media filters, mixed-media filters, carbon filters, string-wound or blow-molded cartridge filters, or membrane filters such as ultra-filtration or micro-filtration.

In some cases, the seeded slurry process can provide effective results. In this process, a known amount of salts (example: $CaSO_4$) are added to the reactor vessel to promote fast chemical reaction.

Inversely, the novel softening process disclosed herein can be usefully employed for the recovery of precious minerals such as calcium, magnesium, barium, strontium, iron, and manganese.

Alternative/Substitute Chemicals.

In some cases, waste chemicals such as waste alkali from industrial operations, demineralizer regeneration operations, waste alkali from aluminum or iron fabrication processes, waste potash (potassium carbonate), or waste potassium hydroxide could be used in place of pure chemicals.

The use of these waste chemical streams presents a twofold advantage to the commercial operator: first, one reduces the burden on the environment by not disposing waste chemicals which would have to be neutralized prior to discharge in most countries; and, second, one can minimize the raw direct chemical costs for the process, since fresh, high-purity chemicals can be very expensive.

In some cases, as described hereinabove, waste gases such as carbon dioxide or carbon monoxide could be combined with an alkaline solution such as sodium hydroxide or potassium hydroxide to form bicarbonate or carbonate ions. These bicarbonate or carbonate ions can then react with the incoming Ca, Mg, Ba or Sr to form the precipitate.

In some cases, sulfate ions can be added to form a precipitate. Sulfate ions can be derived from the use of certain inorganic salts such as barium sulfate.

In some cases, crushed lime, hydrated lime, or pulverized soda ash can be considered.

On-Site Generation of Bicarbonate or Carbonate Species.

One way to create a sodium carbonate or sodium bicarbonate solution is to react carbon dioxide with sodium hydroxide or potassium hydroxide in a reactor column. Specifically, a sodium hydroxide or potassium hydroxide solution is sprayed in an absorption column that consists of a reactor vessel, internal distributors, and a mass-transfer packing (structured packing or thimped packing).

Carbon dioxide ($CO_2$) gas is introduced at the bottom of the reactor vessel in a counter-current manner. After reaction, either the sodium carbonate or potassium carbonate solution is collected in the receiver vessel, ready for use. At a pH above 8.2, one expects to find mostly carbonate species. At a pH below 8.2, one expects to find an equilibrium of bicarbonate and carbon dioxide.

Case Study

In a recent case study the novel softening process was found to be effective for the reduction of Ca and Mg from the levels of 10,500 ppm (Expressed as $CaCO_3$) to less than 0.01 ppm, Ba reduction from 12 ppm to 0.4 ppm, Sr reduction from 382 ppm to 16.9 ppm Silica from 61 ppm to 8.6 ppm, TOC reduction from 30 ppm to 4.7 ppm, oil and grease from 21 ppm to less than 1 ppm, iron from 27 ppm to 2.7 ppm Copper from 4.9 ppm to less than 0.01 ppm, zinc from 2.76 to less than 0.01 ppm.

I claim:

1. A process for removing at least some contaminants selected from the group consisting of Ca, Mg, Ba, Sr, Cu, Zn, iron, Mn, Al, $SiO_2$, TOC, oil, grease and TDS and TSS from a contaminated water stream, the process consisting essentially of:
   a) collecting a quantity of the water stream containing said contaminants for treatment;
   b) analyzing the water stream containing said contaminants for a composition and an amount of said contaminants in the water stream;
   c) adding a calculated amount of at least one of carbonate or bicarbonate to the quantity of the water stream in an amount at least equivalent to said contaminants in the quantity of the water stream;
   d) adjusting the pH of the quantity of the water stream to a value from about 10.5 to 14 with sodium hydroxide or potassium hydroxide;
   e) adding a coagulation aid chemical to the quantity of the water stream;
   f) adding at least one polyelectrolyte selected from the group consisting of positive or negative polyelectrolyte chemicals to the quantity of the water stream;
   g) allowing solids formed including said contaminants and carbonate and hydroxide precipitates in the quantity of the water stream to settle or rise in the water;
   h) separating the solids from the quantity of the water stream; and,
   i) recovering the water stream containing a reduced contaminant content.

2. The process of claim 1 wherein the quantity of the water stream is collected in a storage tank containing a separation system for removing precipitated contaminants from the storage tank.

3. The process of claim 1 wherein the coagulation chemical is selected from the group consisting of ferric chloride, alum, ferric sulfate and a waste caustic soda from an alumina plant.

4. The process of claim 1 wherein the formed solids settle in the quantity of the water stream.

5. The process of claim 1 wherein the formed solids remain in suspension or float in the quantity of the water stream.

6. The process of claim 1 wherein the formed solids are separated from the quantity of the water stream by a mechanical solid/liquid separator.

7. The process of claim 6 wherein the mechanical solids/liquid separator is selected from the group consisting of a rotary drum vacuum filter, a filter press, a media filter, a membrane filter, or an ultra-filter system or a micro-filter system.

8. The process of claim 1 wherein the calcium and magnesium contaminants in the quantity of the water stream are removed to a level less than 100 parts per million.

9. The process of claim 1 wherein the calcium and magnesium contaminants in the quantity of the water stream are reduced to less than 99 percent of the calcium and magnesium initially present.

10. The process of claim 1 wherein steps a), c), d), e), and f) may be carried out in the storage tank.

11. The process of claim 1 wherein the pH is adjusted to from about 12 to about 14.

12. The process of claim 1 wherein the calcium and magnesium contents, stated as $CaCO_3$, of the water is reduced to less than 100 ppm and the TOC content of the water is reduced by up to 84 percent.

* * * * *

UNITED STATES PATENT AND TRADEMARK OFFICE
CERTIFICATE OF CORRECTION

PATENT NO.        : 8,147,696 B1                                   Page 1 of 1
APPLICATION NO.   : 11/523679
DATED             : April 3, 2012
INVENTOR(S)       : Ken V. Pandya It is certified that error appears in the above-identified patent and that said Letters Patent is hereby corrected as shown below:

Column 11,
Line 3, delete "thimped" and insert --dumped--

Signed and Sealed this
Fifth Day of February, 2013

Teresa Stanek Rea
*Acting Director of the United States Patent and Trademark Office*